Dec. 22, 1942.　　　M. MAHLER　　　2,305,886
TIRE TOOL
Filed April 15, 1941
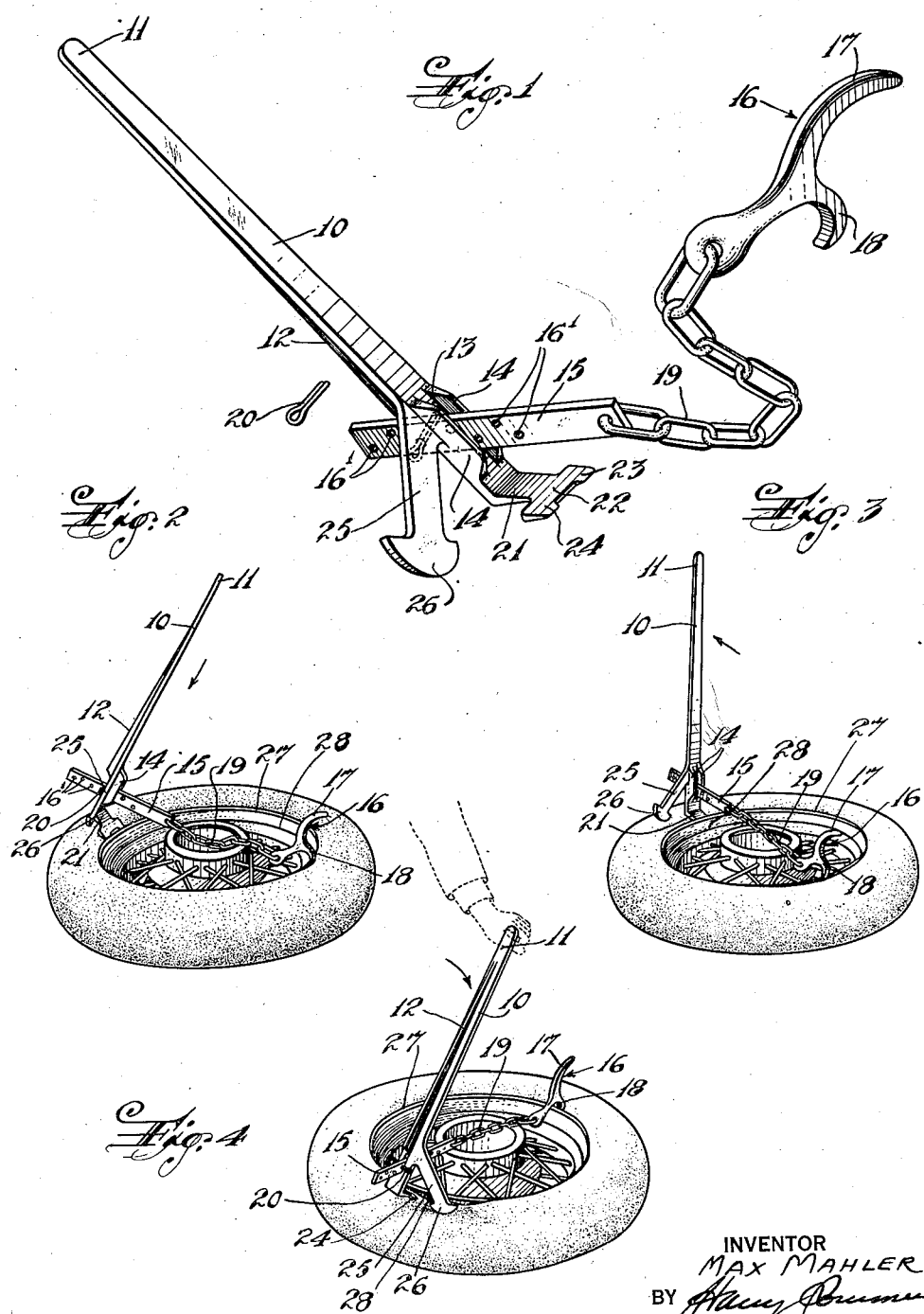
INVENTOR
MAX MAHLER
BY
ATTORNEY Patented Dec. 22, 1942

2,305,886

UNITED STATES PATENT OFFICE 2,305,886

TIRE TOOL

Max Mahler, Newark, N. J., assignor of one-half to Bernard Mahler, Linden, N. J.

Application April 15, 1941, Serial No. 388,618

1 Claim. (Cl. 157—6)

This invention relates to improvements in tire breaking tools and more particularly to a tire breaking tool adapted for use in connection with "drop center" rims.

Wheel rims of the "drop center" type are provided with portions designed to receive the tire casing beads, to which the tire casing tenaciously adheres so that it becomes difficult to break the tire from the rim for repair or replacement.

Wheel rims of recent development present an even greater problem in the breaking of the tire from the rim, as such rims are popularly provided with peripheral "humps" or shoulders defining the saddle and V drop center portions of the rim. These rims are popularly called "safety rims" for the reason that, upon inflation of the tire, the casing bead snaps into the saddle portion where it is maintained in position even though deflation occurs, by the peripheral "humps" or shoulders thus decreasing the risk of the tire being mangled or thrown from the wheel when a blowout occurs.

The object of my invention is to provide a tire breaking tool incorporating novel features providing increased leverage and facility of insertion for the breaking of the tire from the drop center rim. A further object of my invention is to provide a tire breaking tool which may be readily adapted for use, with equal efficacy, in connection with tire rims of varying diameters.

These and other advantageous objects, which will later appear, are accomplished by the simple and practical construction, combination, and arrangement of parts hereinafter described and exhibited in the accompanying drawing, in which:

Fig. 1 is a perspective view of a tire breaking tool embodying my invention,

Fig. 2 is a perspective view showing the device of my invention in its position of initial application to a wheel, Fig. 3 is a similar view showing the second step in the application of the device of my invention to a wheel, and Fig. 4 is a similar view showing the final step in the application of the device of my invention in the breaking of a tire from the rim of the wheel.

Referring to the drawing, wherein like reference numerals indicate like parts, the tire breaking tool of my invention is shown to comprise an elongated bar 10 which is preferably of upwardly tapered outline, the upper end 11 serving as a handle in the application of the device (presently described in greater detail) the bar being preferably provided with a medial upstanding reenforcing rib 12 at the rear face thereof, said rib being likewise tapered toward the handle 11. The lower end of the bar 10 is provided with an aperture 13 defined by parallel upstanding reenforcing and guiding ribs 14 which also serve to facilitate the insertion of the plate 15 in the aperture 13 as indicated in Fig. 1 of the drawing, the plate 15 being provided at one end with an anchoring member 16 which is provided with a curved ear 17 to facilitate manipulation of the anchoring member 16 and with a depending arcuate stud 18 for a purpose presently explained. The anchoring member 16 is secured to the plate 15 by means of a flexible or other connecting medium 19 which will provide for the free manipulation and rotation of the anchoring member 16 relative to the plate 15. In the particular form of my invention illustrated in the drawing, the connecting medium is shown to consist of a plurality of links 19 preferably secured to the plate 15 and anchoring member 16 by being passed through suitable apertures therein as shown in Fig. 1. The plate 15 is provided with means to provide a pivotal bearing for the bar 10; in the form illustrated in the drawing this pivotal bearing means consists of a plurality of apertures 16' for the reception of a pin 20 which, as will become apparent from an inspection of Figs. 1 and 2 of the drawing, serves as a pivot bearing for the bar 10. The pin is positioned in the particular aperture 16' required to accommodate the device to the diameter of the wheel in connection with which the device is to be used.

The lower end 21 of the bar 10 is offset and tapered and terminates in a bifurcated wedge shaped portion 22 with spaced, wedge shaped studs 23 and 24. The bar 10 is further provided with a laterally depending and offset arm 25 terminating in an arcuately disposed head 26.

The devices of my invention may be made of any suitable material; I have found it advantageous to make the same of relatively inexpensive alloys but it may be made of any other desired or convenient materials.

As will be noted from an inspection of the drawing, the device is reenforced by the ribs 12, 14 at those portions which are subjected to great strains in the normal use of the device.

Figs. 2–4 illustrate the manner of application and use of the device of my invention, which will now be related in greater detail.

The device of my invention is designed primarily for use in connection with "drop center" rims. Preliminary to the application of the tool of my invention, the valve core of the tire is removed and the tire deflated. The anchoring member 16 is positioned, as shown in Fig. 2, over the rim flange 27, and the pin 20 is inserted in the appropriate aperture 16' of the plate 15. With the bar 10 positioned angularly on the rim, the bifurcated lower portion 22 thereof resting against the rim flange 27 at a point diametrically opposite that at which the anchoring member 16 is positioned over the rim flange 27. In tilting the bar 10 outwardly as in Fig. 3, the bar tilts and bears against the pin 20 with the anchoring member 16 providing a bearing; the bifurcated end 22 of the bar is forced intermediate the tire and rim until said end 22 rests upon the saddle portion 26 of the rim as in Fig. 3. It is then merely necessary to tilt the bar 10 laterally as indicated by the arrow in Fig. 4, to break the tire from the rim. The stud 23, bearing against the rim provides a fulcrum point; the stud 24 breaks the tire bead from the rim, the head 26 of the offset arm 25 of the bar 10 cooperating in the breaking of the tire from the rim.

It will be noted from the foregoing that with the device of my invention, the breaking of a tire from a "drop center" rim is reduced to a relatively simple and rapid operation requiring a minimum of time and effort. The device is adapted admirably for the breaking of tires from rims of a "drop center" type, which operation heretofore has been extremely difficult.

While it is possible to use the tool without the anchoring means 16 or with a different type of anchoring means, I have found the anchoring means 16 of advantage in attaining the highest efficiency in the use of the tool of my invention.

Having thus described my invention, what I claim as new and desire to secure by Letters Patent, is:

A tire removing tool comprising a bar provided with an offset wedge shaped portion at one end adapted for insertion between a tire and rim of a wheel, said bar being further provided with an aperture and with a laterally depending and offset arm disposed in the plane of the bar, a plate positioned in said aperture, means secured to the plate and adapted to be engaged by the bar to provide a bearing for the bar, an anchoring member adapted to be positioned over the wheel rim diametrically opposite the point of insertion of the offset portion of the bar, and means for flexibly connecting the anchoring member to the plate.

MAX MAHLER.